No. 730,879. PATENTED JUNE 16, 1903.
F. M. CONROY, A. BURSON & F. W. FITCH.
COMBINED SIDE DELIVERY HAY AND SHOCKED GRAIN LOADER.
APPLICATION FILED APR. 24, 1902.
NO MODEL. 8 SHEETS—SHEET 6.
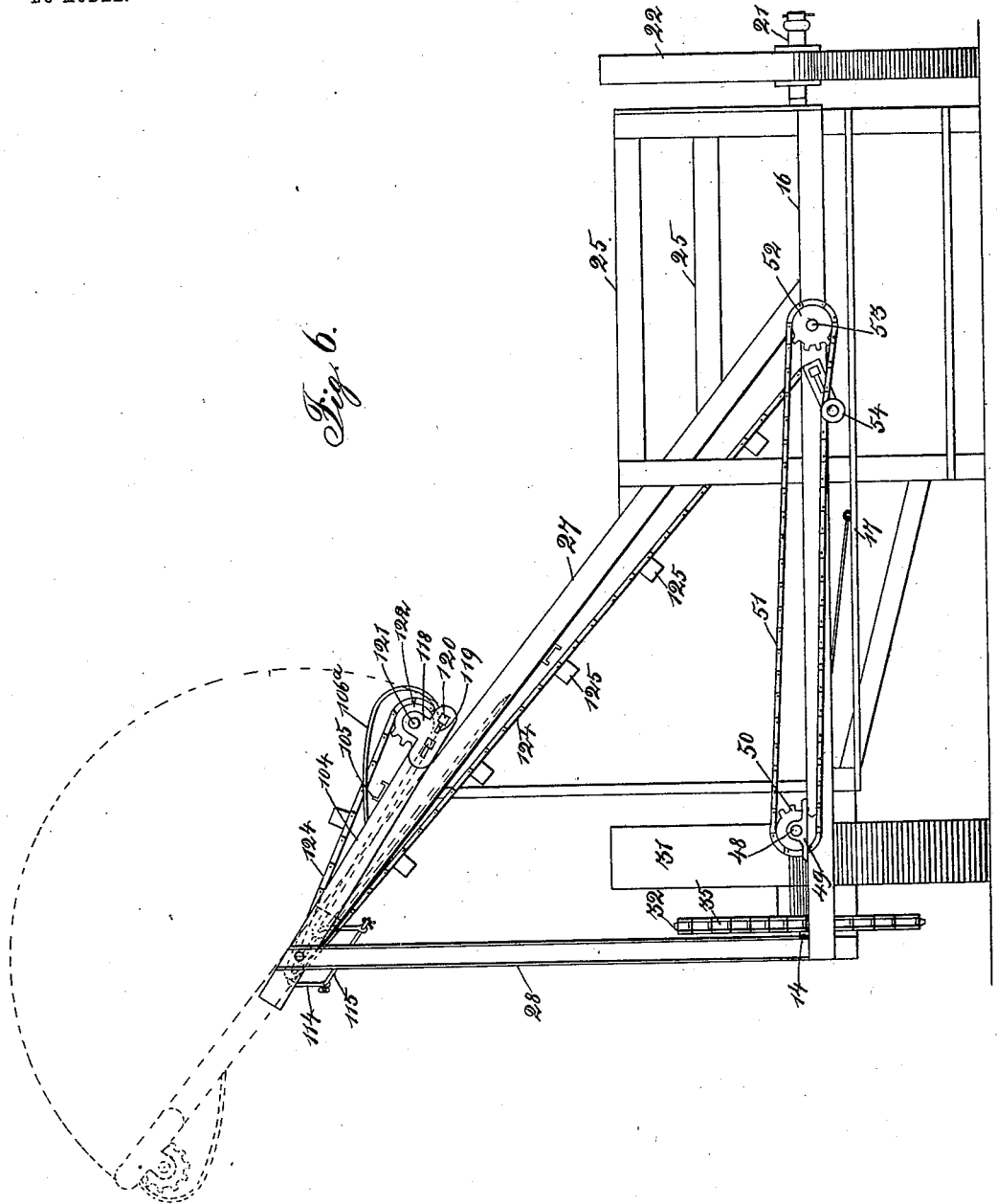

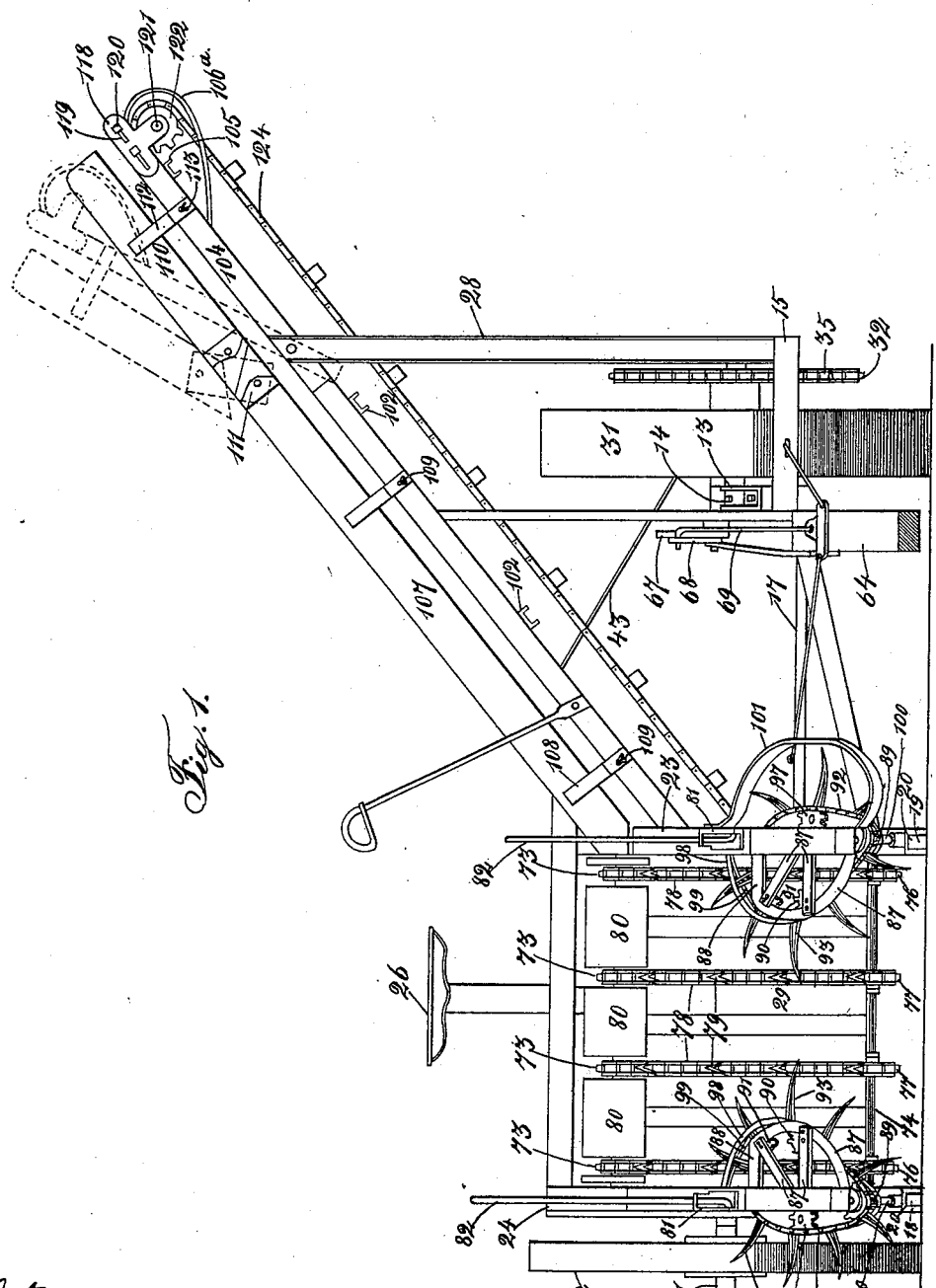

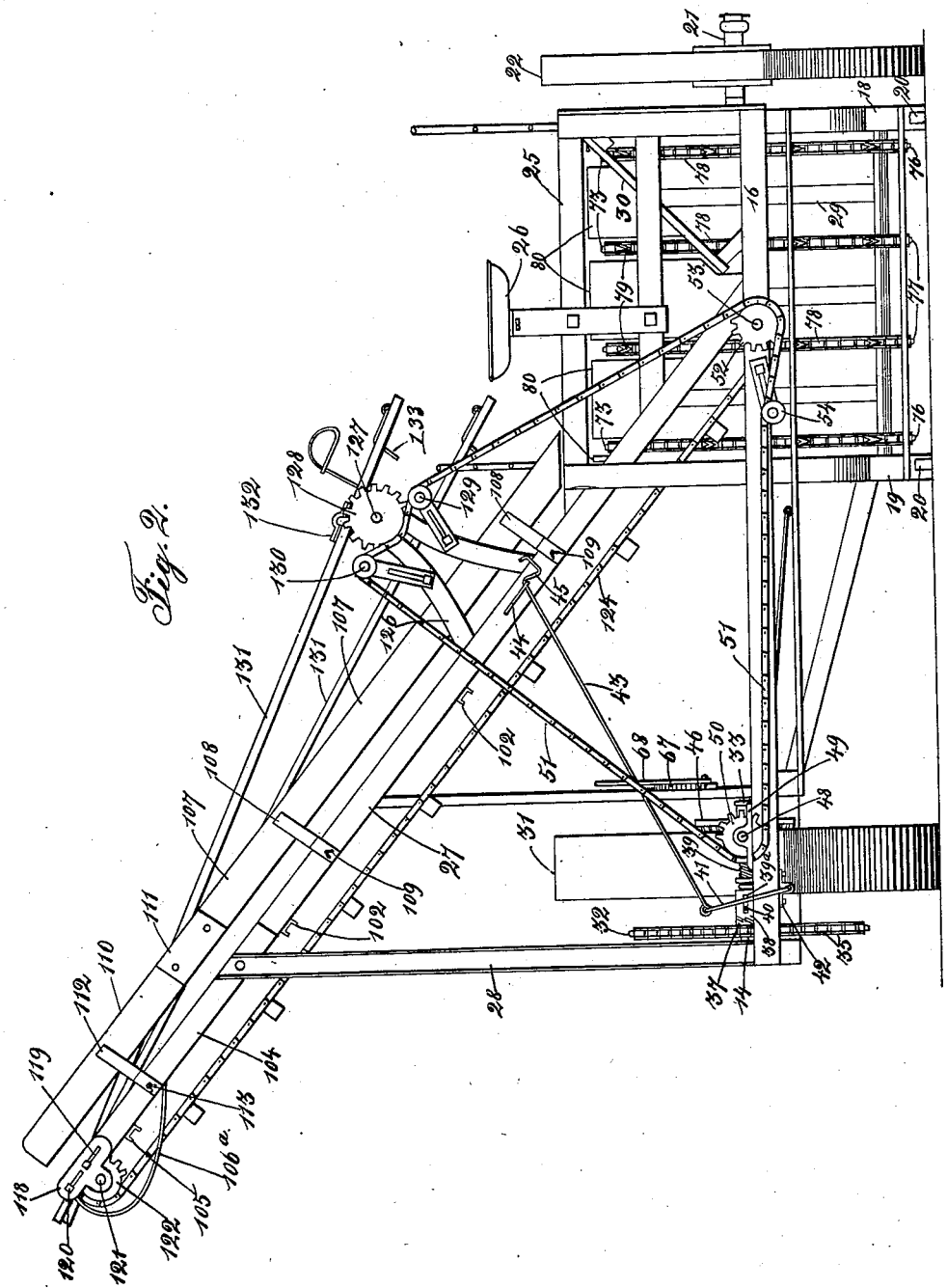

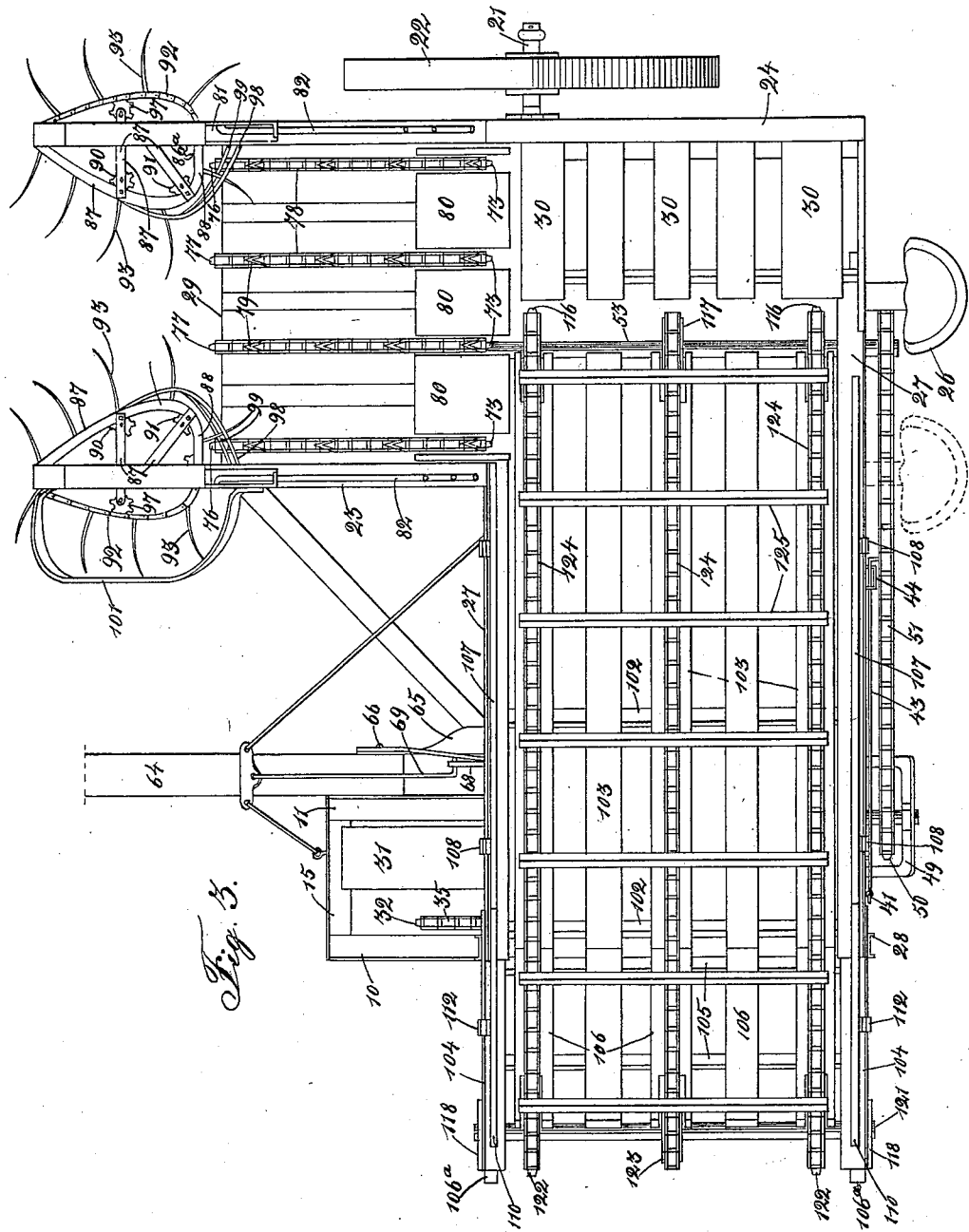

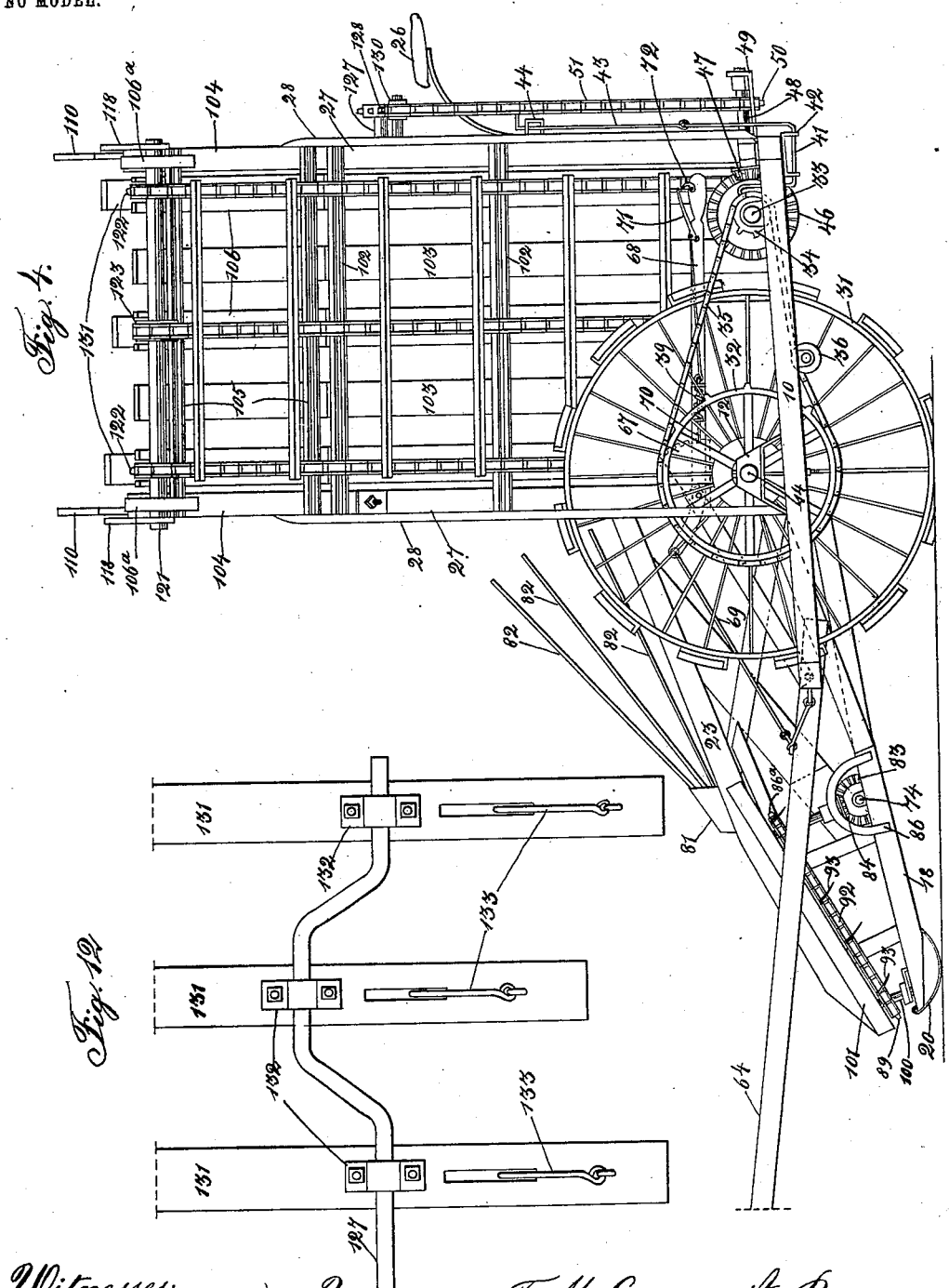

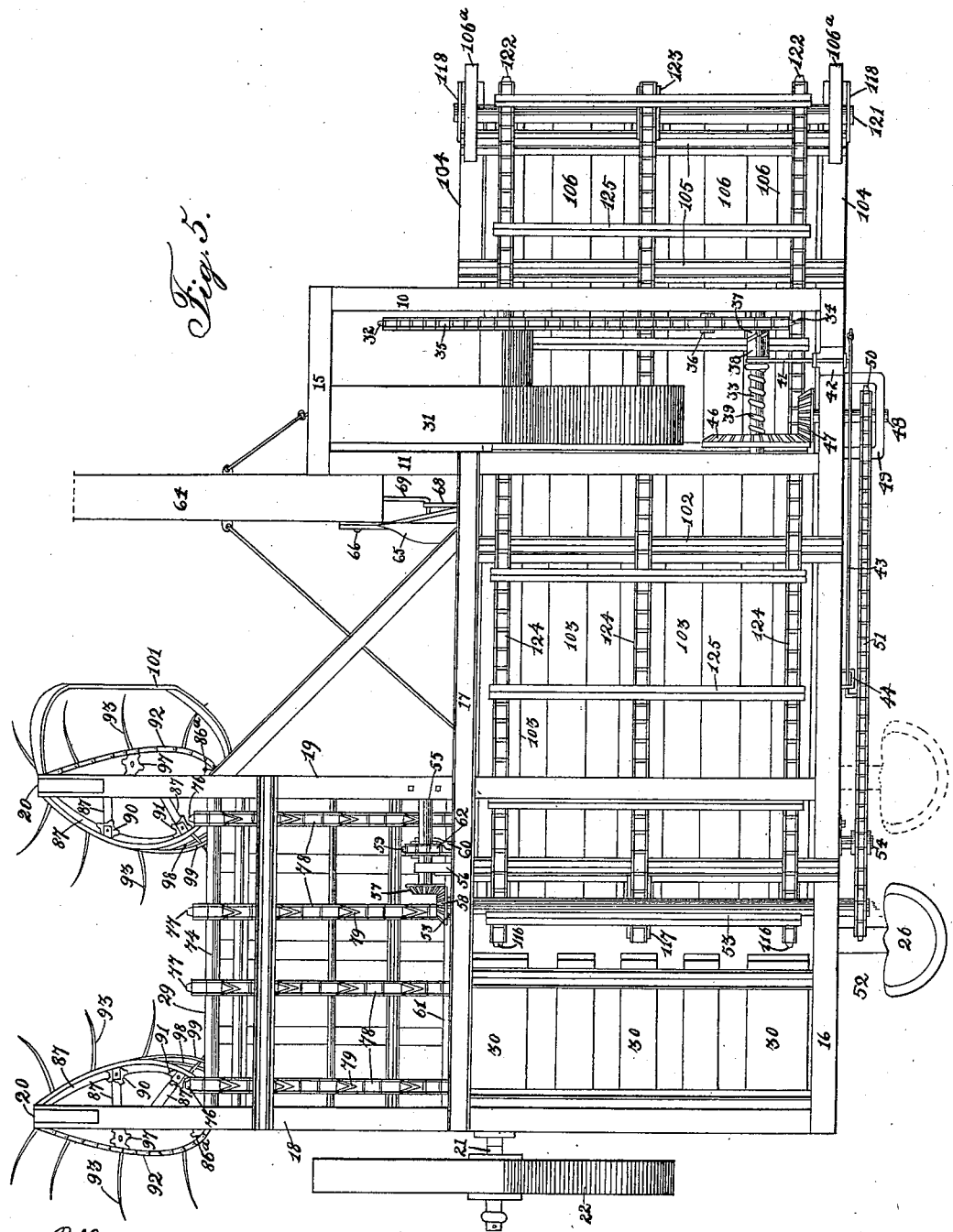

No. 730,879. PATENTED JUNE 16, 1903.
F. M. CONROY, A. BURSON & F. W. FITCH.
COMBINED SIDE DELIVERY HAY AND SHOCKED GRAIN LOADER.
APPLICATION FILED APR. 24, 1902.
NO MODEL. 8 SHEETS—SHEET 7.
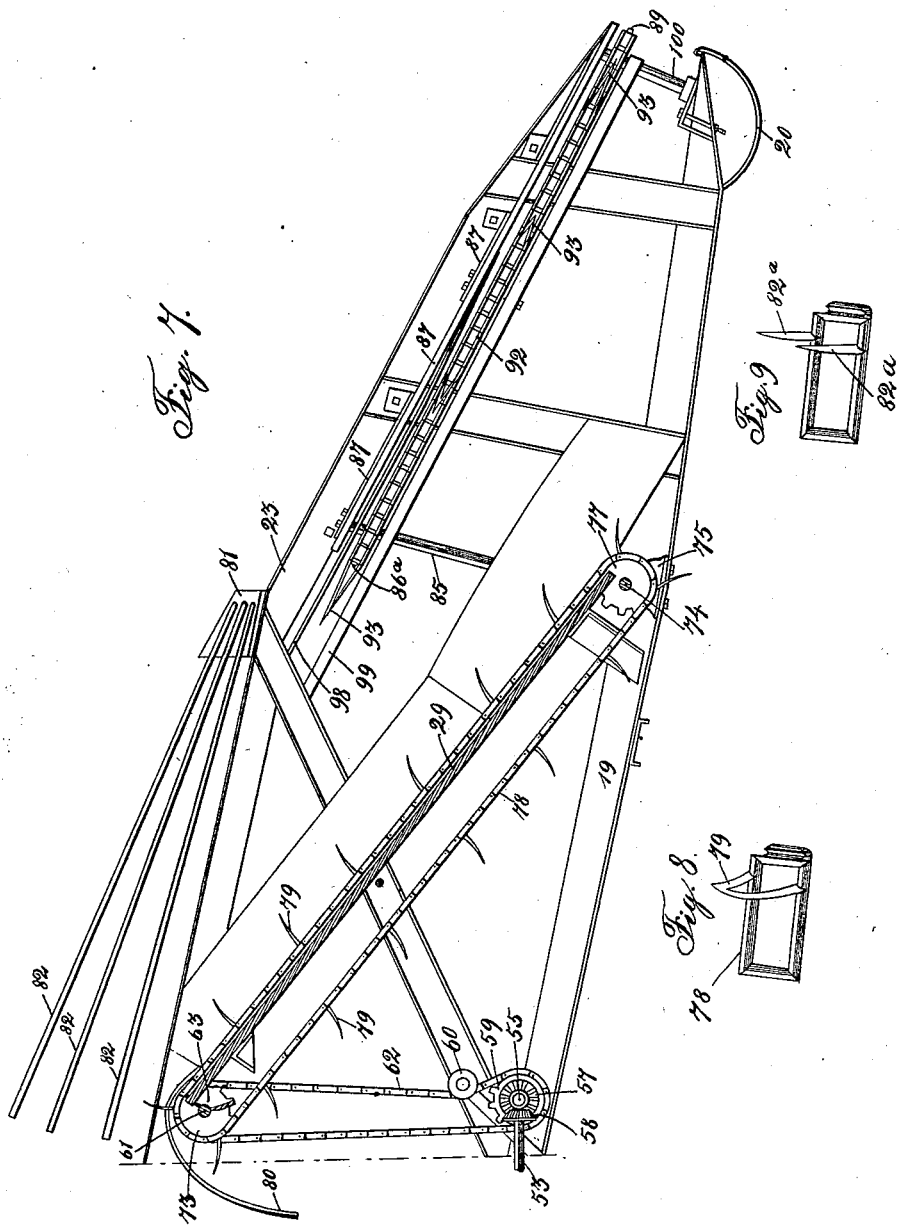

No. 730,879. PATENTED JUNE 16, 1903.
F. M. CONROY, A. BURSON & F. W. FITCH.
COMBINED SIDE DELIVERY HAY AND SHOCKED GRAIN LOADER.
APPLICATION FILED APR. 24, 1902.
NO MODEL. 8 SHEETS—SHEET 8.
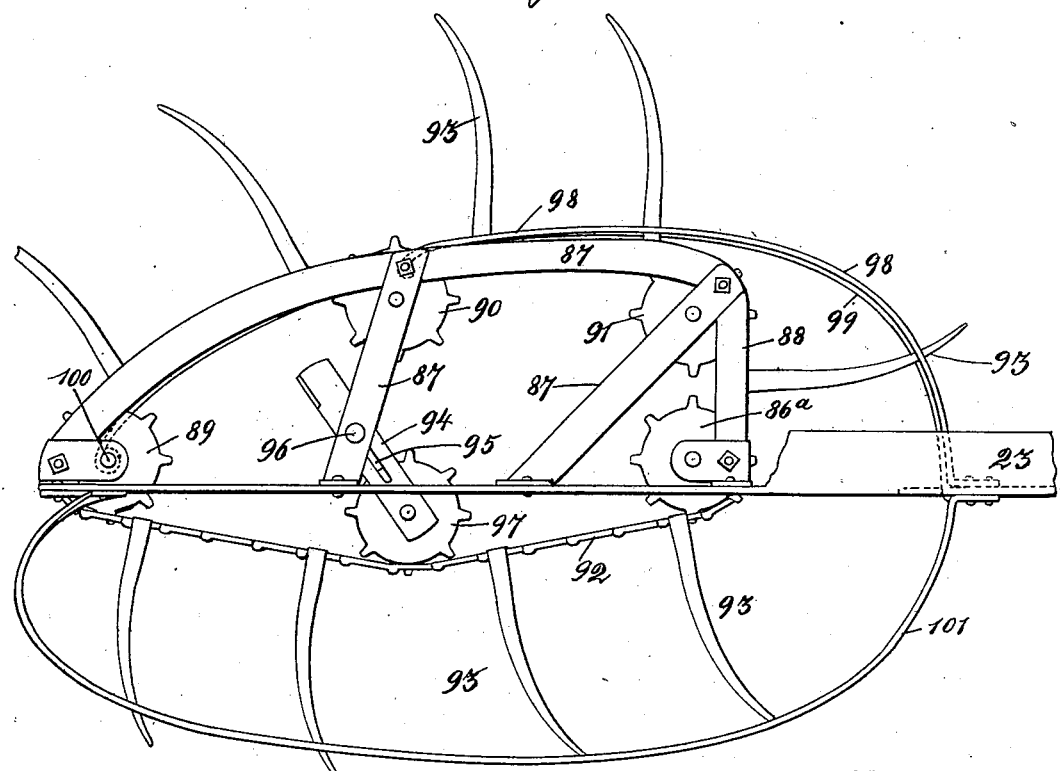
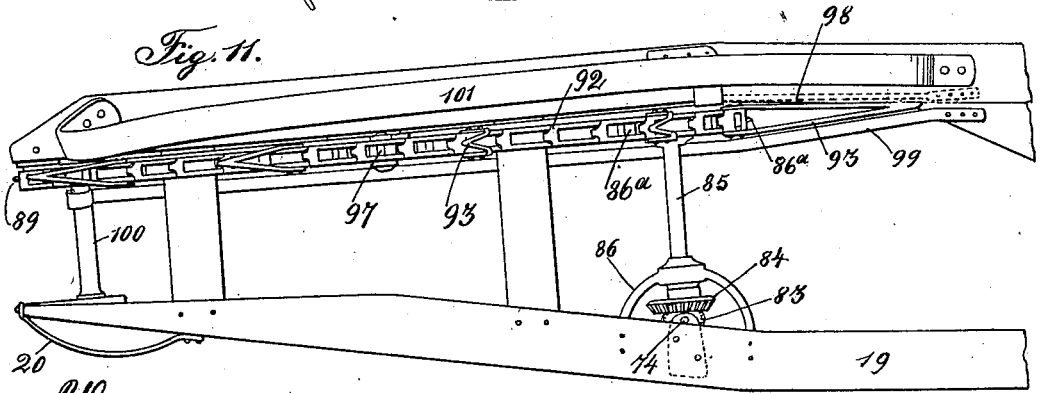
Witnesses: Inventors: F. M. Conroy, A. Burson,
and F. W. Fitch.
by Orwig & Lane Attys.

No. 730,879. Patented June 16, 1903.

UNITED STATES PATENT OFFICE.

FRANK M. CONROY, ABRAHAM BURSON, AND FRED W. FITCH, OF FONDA IOWA.

COMBINED SIDE-DELIVERY HAY AND SHOCKED-GRAIN LOADER.

SPECIFICATION forming part of Letters Patent No. 730,879, dated June 16, 1903.

Application filed April 24, 1902. Serial No. 104,495. (No model.)

*To all whom it may concern:*

Be it known that we, FRANK M. CONROY, ABRAHAM BURSON, and FRED W. FITCH, citizens of the United States, residing at Fonda, in the county of Pocahontas and State of Iowa, have invented certain new and useful Improvements in a Combined Side-Delivery Hay and Shocked-Grain Loader, of which the following is a specification.

The objects of our invention are to provide a machine of simple, durable, and inexpensive construction to be advanced over the ground-surface and susceptible of adjustment thereto to engage and elevate hay in windrows or shocks of grain and to conduct the same to a point of discharge at the side of the machine, whereby the hay or bound grain may be deposited in a wagon advanced alongside of the machine.

A further object is to provide simple, inexpensive, and easily-operated gathering mechanism designed to have a comparatively long reach for engaging grain near the ground-surface and for carrying it upwardly and toward the conveyers in such manner as to avoid threshing out the grain to as great an extent as is possible with a machine of this class and to carry it a considerable distance up to the toothed conveyer to prevent the toothed conveyer from threshing out the grain, and, further, in this connection to provide simple and efficient means for withdrawing the gathering-arms from the bundles of grain after the grain has been deposited on the conveying-chains.

Our invention consists in certain details in the construction, arrangement, and combination of the various parts of the device, whereby the objects contemplated are attained, as hereinafter more fully set forth, pointed out in our claims, and illustrated in the accompanying drawings, in which—

Figure 1 shows a front elevation of the complete machine and by dotted lines showing the outer end of the lateral conveyer in its elevated position. Fig. 2 shows a rear end elevation of same. Fig. 3 shows a top or plan view of the complete machine. Fig. 4 shows a side elevation of the complete machine. Fig. 5 shows an inverted plan view of the complete machine. Fig. 6 shows a rear end elevation of a part of the machine-frame with the outer end of the lateral conveyer in its folded position and by dotted lines showing this portion in its extended position. Fig. 7 shows a vertical sectional central view of the forward conveyer and connecting adjacent parts of the machine-frame. Fig. 8 shows a detail perspective view of one of the toothed links of the forward conveyer-chains. Fig. 9 shows a similar view illustrating a modification. Fig. 10 shows an enlarged detail plan view of one of the gathering devices. Fig. 11 shows a side elevation of same, and Fig. 12 shows a detail plan view of a part of the hay-loader.

Referring to the accompanying drawings, we shall describe separately the various machine elements.

*The machine-frame.*—The reference-numerals 10 and 11 indicate parallel sills supporting the brackets 12 and 13, in which the axle 14 of the traction-wheel is fixed. At the front end of the sills 10 and 11 is the crosspiece 15, and at the rear end thereof is a cross lateral sill 16, extending completely across the machine-frame.

The numeral 17 indicates a sill in front of the sill 16 and parallel therewith, extending from the longitudinal sill 11 to the opposite side of the machine-frame, and a longitudinal sill 18 is arranged substantially at right angles to the sills 16 and 17 and extends from the rear end of the machine-frame to the front end thereof.

The numeral 19 indicates a sill parallel with the sill 18 and extending from the sill 16 at the rear to the front end of the machine-frame. These sills 18 and 19 are parallel with each other and are inclined downwardly from the point of attachment at their rear ends to their forward ends and provided at their front end portions with runners 20 to engage the ground-surface when the front end of the machine is tilted downwardly. Mounted upon the sill 18 in line with the axle 14 is an axle 21, designed to receive a supporting-wheel 22. Erected upon the sill 18 is a frame 23, the forward end portion of which is designed to support the gathering mechanism, to be hereinafter described, and parallel with the frame 23 is a frame 24 on the forward end of the sill 19, also designed to support some of the gathering mechanism, as will hereinafter appear.

The frames 23 and 24 are connected at their rear ends by cross-pieces 25, to which the seat 26 is adjustably attached. The lateral conveyer is supported by the side pieces 27, the lower ends of which are fixed to the transverse sills and the upper ends of which are connected with the uprights 28, the lower ends of which uprights are fixed to the sill 10. The outer end portion of the lateral-conveyer frame is hinged to the body portion thereof, as will hereinafter appear.

The numeral 29 indicates a fixed platform between the frames 23 and 24, inclined upwardly and rearwardly, and the numeral 30 indicates a slotted frame extending from the top portion of the frame 24 in the rear of the fixed platform 29 downwardly and toward the lateral-conveyer frame. By this means it is obvious that a strong, rigid, and well-balanced frame is provided for the machine.

*Draft and gearing.*—The reference-numeral 31 indicates the traction-wheel, loosely mounted on the axle 14. Connected with the hub of the traction-wheel and on the outer side thereof is a sprocket-wheel 32.

The numeral 33 indicates a shaft rotatably mounted in bearings fixed upon the sills 10 and 11 in the rear of the traction-wheel. Loosely mounted upon this shaft 33 is a sprocket-wheel 34, connected, by means of a chain 35, with the sprocket-wheel 32, and the under portion of the chain 35 is engaged by a chain-tightener 36 of ordinary form. Fixed to the sprocket-wheel 34 is a ratchet clutch member 37, and a sliding clutch member 38 is mounted on the shaft 33 and normally held in engagement with the clutch member 37 by the extensile coil-spring 39 on the shaft 33. This clutch member 38 is provided with a slot 39$^a$ to receive the pin 40, fixed to the shaft 33, so that this clutch member is slidingly and non-rotatably connected with the shaft 33.

We have provided means whereby the clutch member 38 may be held out of engagement with its mate, as follows: The numeral 41 indicates a rock-shaft mounted in bearings 42 on the sill 16 and having one end entering an annular groove on the clutch member 38 and its other end projected upwardly. A rod 43 is pivoted to the upwardly-extending end of the rock-shaft 41 and passed through a loop 44 on the lateral-elevator frame in position adjacent to the driver's seat, and a shoulder 45 is formed in said rod to engage the loop 44 and hold the clutch member 38 out of engagement with the clutch member 37, so that the traction-wheel may turn without operating the shaft 33. Keyed to the shaft 33 is a gear-wheel 46, meshed with a smaller gear-wheel 47, which in turn is keyed to the shaft 48, which shaft is mounted in bearings on the sill 16 and in bearings in a frame 49, which is also fixed to the same sill. A sprocket-wheel 50 is keyed to this shaft 48, and a chain 51 connects it with a sprocket-wheel 52 on a shaft 53, which extends longitudinally of the machine-frame to a point a slight distance in advance of the sill 17 and which has bearings in sills 16 and 17. A chain-tightener 54 of ordinary construction is provided for this chain 51 and is attached to the sill 16. This shaft 53 is designed to drive the lateral conveyer, as will hereinafter appear.

We provide means for driving the first conveyer, as follows: The numeral 55 indicates a shaft mounted in bearings on the sill 19 and in bearings on a frame 56 on sills 17. Said shaft extends transversely of the machine-frame. Keyed to this shaft 55 is a beveled gear-wheel 57, meshed with a beveled gear-wheel 58 on the shaft 53. A sprocket-wheel 59 is also keyed to the shaft 55, and a chain-tightener 60 of ordinary construction is fixed to sills 17 at one end and projected upwardly above the sprocket-wheel 59. Above the shaft 55 is another transverse shaft 61, having bearings in the frames 23 and 24 directly at the rear of and slightly beneath the upper end of the inclined fixed platform 29. A sprocket-chain 62 connects the sprocket 59 and a sprocket-wheel 63 on shaft 61, and the chain-tightener 60 engages the chain 62. By this means power is transmitted to the shaft 61, from which the chains of the forward conveyer are driven, as will hereinafter appear.

We have provided means for driving our gathering mechanism by power transmitted from the chains of the forward elevator, and this gearing device will be described in connection with the description of said gathering mechanism.

From the foregoing description it is obvious that power is transmitted from the traction-wheel to the various operative parts by simple and direct means, and by placing the sprocket-wheel at the outer side of the traction-wheel we prevent to a material extent any side draft on the machine-frame.

The numeral 64 indicates the machine-tongue, attached between the forward end portion of the sill 11 and a brace 65 from sill 17, the tongue being pivoted by means of the bolt 66 to swing in a vertical plane to a limited extent. It is to be remembered in this connection that the outer end of the tongue is supported by the draft-animals in an approximately fixed position relative to the ground-surface, and we have provided simple and efficient means for tilting the machine-frame relative to the tongue, as follows: The reference-numeral 67 indicates a sector fixed to a part of the machine-frame, and 68 indicates a lever fulcrumed to a part of the machine-frame concentric with the sector. The lower end of the lever 68 is connected with the rear end of the tongue 64 and in front of it, where it is pivotally attached to the frame, so that when the front end of the tongue is held at a certain height from the ground and when the rear end of the lever 68 is raised or lowered the rear end of the tongue will be raised or lowered and the front end of the frame will be raised or lowered, so that by moving the position of the lever 68 on its pivot the front end of our machine can be raised or lowered relative to the ground. Thus it will be seen that upon raising or lowering the rear end of the lever 68 the entire machine-frame will be tilted upwardly or downwardly relative to the ground and the rear end of the tongue will be raised or lowered as the lever is operated. A spring-actuated pawl is mounted on the lever 68 to engage the sector 67, said pawl being controlled by means of a pivoted handle 71, for which a pivoted latch 72 is provided on the lever 68, so that by means of the spring on the spring-actuated pawl the handle 71 will be held close to the lever 68, and the pawl 70 will be held out of engagement with the sector, thus leaving the machine-frame free to tilt relative to the tongue, and by drawing the pivoted handle 71 out of engagement with the lever 68 the pawl will engage the sector, and by adjusting the latch 72 to hold the handle out of engagement with the lever 68 the pawl 70 will be held in engagement with the lever, thus holding the tongue firmly in position relative to the machine-frame.

*Forward elevator.*—We have previously described the manner in which power was transmitted to the shaft 61 of the forward elevator. Mounted upon this shaft 61 are four sprocket-wheels 73, which are keyed to the shaft, and they are of such size that their upper portions extend a slight distance above the top surface of the fixed platform 29. Mounted beneath the lower end portion of the platform 29 is a shaft 74, rotatably mounted in bearings 75, attached to the sills 23 and 24. Keyed to the shaft 74 are two sprocket-wheels 76 in line with the two outer sprocket-wheels 73, and loosely mounted upon this shaft are two sprocket-wheels 77 in line with the central sprocket-wheels 73. Four endless sprocket-chains 78 are passed over these sprocket-wheels, and when the sprocket-wheels are rotated the chains obviously move upwardly and rearwardly above the fixed platform 29 and return beneath the platform. Each of these chains is provided with a number of teeth 79, which teeth are preferably formed integral with the links of the chain, and they are of such length that when passing forwardly under the forward sprocket-wheels 76 and 77 they will come close to the ground-surface, and when traveling upwardly and rearwardly above the platform 29 the chains will rest upon the platform and the teeth will project upwardly and forwardly.

Our object in loosely mounting the central sprockets 77 is to prevent the chains from binding, and the two outer chains furnish sufficient power to drive the gathering mechanism, to be hereinafter described. It is obvious that the teeth 79 will project into bundles or shocks of grain when they are drawn upon the fixed platform, and we have provided means whereby these teeth are easily and yet positively withdrawn from the grain when the chain is passed over the sprockets 73.

The numeral 80 indicates a series of sheet-metal guards, each guard being fixed at one end to the upper end portion of the platform 29 and curved rearwardly and then downwardly, the rear ends thereof being such distance from the sprocket-wheels 73 that the teeth 79 cannot project rearwardly beyond the said guards 80, and the bundles must, of course, follow the guards 80, and thereby forcibly withdraw the teeth from the bundles.

Mounted on top of each of the frames 23 and 24 is a bracket 81, and projecting rearwardly and upwardly from each bracket is a series of spring fender-rods 82.

Obviously by means of the elevator just described bundles of grain or hay will be picked up from the ground-surface and carried upwardly and rearwardly over the fixed platform and be prevented from falling over either side of the platform by means of said fenders, and when the hay or bundle of grain reaches the guards 80 it will be discharged from the platform, and the teeth 79 will be withdrawn therefrom by means of the guards 80.

In Fig. 9 we have shown a modification illustrating a form of link having two upright prongs $82^a$ to be used in lieu of the tooth 79, before described.

*Gathering mechanism.*—The gathering mechanism is designed to pick up bundles of grain from the ground-surface and drop such bundles upon the forward elevator and also to engage bundles of grain and throw them inwardly toward the central portion of said forward conveyer. There are two independent gathering mechanisms, one for each side of the machine, and as these devices are identical in construction but one will be hereinafter specifically described. We have before shown how power was transmitted to shaft 74, and the power to operate the gathering mechanisms is received from this shaft.

The numeral 83 is used to indicate a beveled gear-wheel keyed to shaft 74, and 84 indicates a beveled gear-wheel meshed with the beveled gear-wheel 83 and keyed to a shaft 85, which shaft projects upwardly and forwardly and has its bearings in the top of the frame 23, and its lower end has bearings in a bracket 86, fixed to the frame 23 on opposite sides of shaft 74. Keyed to this shaft 85 is a sprocket-wheel $86^a$. Mounted upon the inner face of the forward end portion of the frame 23 is a frame 87, which projects from the front end of the frame 23 rearwardly and inwardly toward the longitudinal center of the platform 29 and upwardly for a short distance and then straight outwardly toward the frame 23 at the point 88. This frame supports a series of sprocket-wheel idlers 89, 90, and 91, around which a sprocket-chain 92 is arranged to travel. Fixed to this chain 92 is a series of gathering-arms 93, each arm being extended at right angles to one of the chain-links. A chain-tightener is provided consisting of an adjustable arm 94, having a slot 95 therein through which a bolt 96 is passed, said bolt being also secured to frame 87. In the outer end of the arm 94 is a sprocket-wheel 97 to engage the chain 92.

From the foregoing description of the gathering mechanism it is obvious that the arms 93 will engage grain resting upon the ground and throw said grain toward the central portion of the platform 29 and carry it rearwardly and upwardly. We have provided means whereby these arms may be withdrawn from the grain, which they engage as follows: The numeral 98 indicates a guide-rod fixed at its forward end to the central portion of the frame 87 and extended from this point rearwardly and inwardly toward the central portion of the platform 29, so that it projects inwardly toward the central portion of the platform 29 farther than the rear end of the frame 87, and the rod 98, furthermore, projects a considerable distance beyond the rear end of the frame 87, and its rear end is attached to the frame 23, and at its point of attachment to said frame it is some distance in the rear of the path of travel of the arms 93. Directly beneath this rod 98 is another guide 99 of the same general shape as the upper guide, except that its forward end is fixed to an upright post 100 at the front end of the frame 23. By means of the guards 98 and 99 the bundles are stripped from the arms 93, and the said arms are also held against up and down movements relative to the chain 92. One of the particular advantages in connection with this portion of our machine is that bundles are not only engaged and thrown inwardly and rearwardly by the arms, but the bundles are also carried rearwardly and upwardly, so that they are deposited upon the fixed platform without being violently shaken or thrown upon said platform—that is to say, the grain is gathered and deposited on the platform without in any way threshing the grain. The inner one of the gathering devices is so arranged that the gathering-arms during their return movement project in a direction toward the tongue, and in order to protect these arms during this part of their movement we have provided a guard 101, fixed at its ends to frame 23 and shaped to prevent a draft-animal hitched to the tongue from striking against these arms 93. We have hereinbefore described the means by which the entire frame of the machine is moved vertically. Obviously by it the entire frame is tilted. Obviously by tilting the frame the gathering-arms 93 will be made to reach close to the ground-surface at the forward end of their movement or to a considerable distance above this point, and hence the device may be readily attached for engaging bundles of grain of different sizes and kinds.

*Side-delivery elevator.*—We have previously described the means by which the bundles of grain are discharged from the rear end of the forward elevator, and in order to load these bundles of grain upon a wagon it is necessary to convey them upwardly and laterally to a point of discharge, from which they may drop into a wagon advanced alongside of the machine. The side pieces 27 of the lateral conveyer have been previously described. Between said side pieces 27 are the cross-pieces 102, upon which the longitudinal slats 103 are supported. At the upper and outer end of the side-delivery elevator is an extension comprising the side pieces 104, pivoted between the side pieces 27 and the uprights 28, so as to be capable of swinging upwardly and inwardly over the upper end of the side pieces 27. These extension side pieces 104 are connected by cross-pieces 105, and slats 106 are connected with the cross-pieces, forming a continuation of the slats 103. By this means it is obvious that the outer end portion of the side-delivery conveyer may be tilted upwardly and may also fold over the body portion of the side-delivery elevator. On the outer end portion of the extension side pieces 104 are the guards 106ª, designed to protect the upper end portion of the conveyer, hereinafter described. In this connection we have provided detachable side boards for the side-delivery elevator, the body portions of which are indicated by the numeral 107, and these are detachably supported above the side pieces 27 by means of the uprights 108, held to the side pieces 27 by means of the cotter-pins 109. Extension side pieces 110 are provided, and they are pivotally connected with the side pieces 107 by the plates 111. The meeting end portions of these side pieces 107 and 110 are beveled, as clearly shown in Fig. 1, so that the side pieces 110 may not sag downwardly at their outer ends, but may bend upwardly, as indicated in dotted lines in said figure. These extension side pieces 110 are connected with the extension side pieces 104 by means of the uprights 112 and cotter-pins 113. The extension-frame of the side-delivery elevator can only be moved to its folded position, as indicated in Fig. 6, as the side pieces have been removed, and when in this position we have provided means whereby the extension-frame may be locked as follows: It is obvious that if the extension side-delivery elevator were turned to the position shown in Fig. 6 the conveyer-chains and cross-piece would become entangled and the chains might become loosened from their sprocket-wheels. To avoid this, we have provided a loop 114, designed to be passed over the cross-pieces at the meeting ends of the main and extension side-delivery frames and also to pass over the cross-pieces of the conveyer both above and below the frames, and a rod 115 is passed through the lower ends of the loop to thereby secure the conveyer in position when the extension-frame is folded. Fixed to the shaft 53 are two sprocket-wheels 116, and between these sprocket-wheels 116 is a smooth wheel 117. At the outer end of the extension-frame are the bearing-boxes 118, provided with slots 119, through which the bolts 120 are passed into the extension, by which the said bearing-boxes may be adjusted longitudinally of the extension-frame. Rotatably mounted in these bearing-boxes is the shaft 121, upon which two sprocket-wheels 122 are fixed, and between the sprocket-wheels 122 is a smooth wheel 123. We have provided an endless conveyer composed of the chains 124 and cross-pieces 125, which pass around the sprockets 116 and 122, and the central chain, which passes around the wheels 117 and 123, so that the said conveyer travels upwardly on top of the slats 106 and returns beneath them. By this means it is obvious that bundles of grain discharged from the forward conveyer will be placed upon the side-delivery elevator and carried to the top of said elevator. Except for the folding feature this side-delivery elevator works in the same manner as other elevators of this class, and further description of its mode of operation is thought to be unnecessary.

*Hay-loader attachment.*—When our machine is used for loading loose hay or grain, it is obvious that the cross-pieces on the side-delivery elevator would not be sufficient to prevent the hay or loose grain from being blown off of the side-delivery elevator, and to avoid this we have provided an attachment which we use when the machine is intended to load hay or loose grain. This attachment comprises two standards 126 to be bolted to the side pieces 27. A crank-shaft 127 is supported in these uprights, and a sprocket-wheel 128 is attached to said shaft. Fixed to one of the uprights 126 adjacent to the sprocket-wheel 128 are two adjustable chain-tighteners 129 and 130. When this attachment is used, we have provided for driving the shaft 127 by the simple expedient of placing a section in the chain 51, making said chain long enough to pass over the chain-tighteners 129 and 130 and under the sprocket-wheel 128. This gives to the shaft 127 a movement in the proper direction.

The numeral 131 indicates a number of flat bars, each having a bearing-box 132 connected with one of the crank-arms of the shaft 127. Each of the bars 131 is also provided with a pivoted tooth 133, normally projected downwardly through a slot in the bar, and the upper ends of these bars slide upon the outer end portion of the side-delivery elevator. The teeth 133 serve to engage the top surface of the layer of grain, and thereby prevent it from being blown away from the side-delivery elevator, and when said elevator is full of grain the upper ends of the bars will rest upon the grain and hold it tightly to the elevator.

Having thus described our invention, what we claim, and desire to secure by Letters Patent of the United States therefor, is—

1. In a machine of the class described, the combination of a machine-frame, an elevator at one side of the machine-frame extending upwardly and rearwardly, gathering mechanism at the front of the said elevator, a side-delivery elevator at the rear of the first-mentioned elevator, a traction-wheel mounted in the machine-frame at the side opposite from the first-mentioned elevator and beneath the side-delivery elevator, a sprocket-wheel operatively connected with the traction-wheel on the side opposite from the elevator, means for driving the first-mentioned elevator, the gathering mechanism, and the side-delivery mechanism from said sprocket-wheel and a tongue connected with the machine-frame between the first-mentioned elevator and the traction-wheel.

2. In a machine of the class described, the combination of a machine-frame, an elevator at one side of the machine-frame extending upwardly and rearwardly, a side-delivery elevator at the rear of said elevator, a traction-wheel mounted in the machine-frame at the side opposite from the first elevator and beneath the side-delivery elevator, a sprocket-wheel operatively connected with the traction-wheel on the side opposite from the first elevator, a shaft mounted in the machine-frame in the rear of the traction-wheel, a sprocket-wheel on the latter shaft, a chain connecting said sprocket-wheels, means for transmitting power from the latter shaft to operate the elevators, a clutch device mounted on the shaft by which the sprocket-wheel on the shaft may be made to rotate in unison with the shaft or to rotate freely on the shaft, a rod for operating said clutch, said rod having a shoulder thereon, and a loop connected with the side-delivery frame through which the said rod is passed and which may be engaged by the shoulder on the rod to hold the clutch out of gear, for the purposes stated.

3. In a machine of the class described, the combination of a machine-frame, an elevator at one side of the machine-frame extending upwardly and rearwardly, gathering mechanism in front of said elevator, a side-delivery elevator at the rear of said elevator, a traction-wheel beneath the side-delivery elevator, a tongue pivoted to the machine-frame between the traction-wheel and the first elevator, means for holding it in various positions, a sprocket-wheel fixed to the hub of the traction-wheel at the side opposite from the first elevator, means for driving the first elevator, the gathering mechanism and the side-delivery mechanism from said sprocket-wheel, for the purposes stated.

4. In a machine of the class described, the combination with a machine-frame, a fixed platform in the machine-frame extending upwardly and rearwardly, toothed sprocket-chains arranged to travel upwardly and rearwardly over the platform, an upright shaft at the lower end of the platform driven by said sprocket-chains, two gathering devices arranged in front and on opposite sides of the said platform, each gathering device comprising a shaft driven from the shaft of the elevator, a sprocket-wheel fixed to the shaft which is driven by the shaft of the elevator, a frame arranged in a plane at right angles to the last-mentioned shaft, a number of sprocket-wheels mounted in said frame, a sprocket-chain encircling the sprocket-wheels, gathering-arms on the sprocket-chain and guides above and below the path of travel of the sprocket-chain at the point where the sprocket-chain moves rearwardly, said guides projecting at their rear ends to such a distance from the same that the gathering-arms will be withdrawn through between the guides, substantially as and for the purposes stated.

FRANK M. CONROY.
ABRAHAM BURSON.
FRED W. FITCH.

Witnesses:
GLEN ELLIS,
GEO. H. FITCH.